(12) United States Patent
Ciplijauskas et al.

(10) Patent No.: US 8,388,020 B2
(45) Date of Patent: Mar. 5, 2013

(54) INFLATABLE MULTILAYER BOLSTER AND METHOD OF MANUFACTURE

(75) Inventors: Rimas Ciplijauskas, Etobicoke (CA); Michael James Best, Newmarket (CA); Babak Fana, Mississauga (CA); Raj S. Roychoudhury, Bloomfield Hills, MI (US)

(73) Assignee: Salflex Polymers Ltd., Weston, Ontario (CA)

( * ) Notice: Subject to any disclaimer, the term of this patent is extended or adjusted under 35 U.S.C. 154(b) by 125 days.

(21) Appl. No.: 12/937,104

(22) PCT Filed: Apr. 14, 2009

(86) PCT No.: PCT/CA2009/000476
§ 371 (c)(1),
(2), (4) Date: Jan. 26, 2011

(87) PCT Pub. No.: WO2009/124395
PCT Pub. Date: Oct. 15, 2009

(65) Prior Publication Data
US 2011/0123739 A1  May 26, 2011

Related U.S. Application Data

(60) Provisional application No. 61/044,294, filed on Apr. 11, 2008.

(51) Int. Cl.
*B60R 21/231* (2011.01)
*B60R 21/205* (2011.01)

(52) U.S. Cl. ............... 280/743.1; 280/732; 280/752; 264/515

(58) Field of Classification Search .............. 280/728.1, 280/731, 729, 730.1, 732, 743.1, 751, 752, 280/748; 297/284.6, 284.4, 284.3, 284.2, 297/284.1, 284.9, 284.11; 264/515
See application file for complete search history.

(56) References Cited

U.S. PATENT DOCUMENTS
(Continued)

FOREIGN PATENT DOCUMENTS
AT         404746       2/1999
DE        1112266       8/1961
(Continued)

OTHER PUBLICATIONS

English translation of DE 10123207; Publication Date: Jul. 4, 2002; Country: DE; Inventor: Tietz Werner; Assignee: Audi NSU Auto Union AG.*

(Continued)

*Primary Examiner* — Joseph Rocca
*Assistant Examiner* — Keith Frisby
(74) *Attorney, Agent, or Firm* — Michael Best & Friedrich LLP

(57) ABSTRACT

Described is an inflatable multilayer bolster for a vehicle passenger compartment including a hollow body with back and front walls, an air chamber formed between them, and an inflator for injecting pressurized fluid to inflate the hollow body. Preferably, both the front and back walls have an inner layer made of a structural deformable material and an outer surfacing layer co-extruded with the inner layer. Also described is a method of manufacturing the multilayer bolster by co-extruding first and second polymers through a die to produce a parison, and then blow-molding the parison to form the hollow body. Thus the front wall and preferably the back wall as well have an inner layer made of the first polymer in a structural deformable condition and an outer surfacing layer made of the second polymer. This co-extruded multilayer constructed bolster allows efficient manufacturing, structural, inflation and aesthetic characteristics.

29 Claims, 2 Drawing Sheets

U.S. PATENT DOCUMENTS

| | | |
|---|---|---|
| 2,834,606 A | 5/1958 | Bertrand |
| 3,185,497 A | 5/1965 | Lagace |
| 3,473,824 A | 10/1969 | Carey et al. |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz et al. |
| 4,597,691 A | 7/1986 | Clarke |
| 4,721,329 A | 1/1988 | Brantman et al. |
| 4,951,963 A | 8/1990 | Behr et al. |
| 5,082,310 A | 1/1992 | Bauer |
| 5,138,721 A * | 8/1992 | Spector ............................ 2/267 |
| 5,273,309 A | 12/1993 | Lau et al. |
| 5,312,133 A | 5/1994 | Pietila et al. |
| 5,324,070 A | 6/1994 | Kitagawa et al. |
| 5,324,072 A | 6/1994 | Olson et al. |
| 5,364,125 A | 11/1994 | Brown et al. |
| 5,370,417 A | 12/1994 | Kelman et al. |
| 5,382,051 A | 1/1995 | Glance |
| 5,447,326 A | 9/1995 | Laske et al. |
| 5,456,490 A | 10/1995 | Carter et al. |
| 5,476,283 A | 12/1995 | Elton |
| 5,498,026 A | 3/1996 | Eckhout |
| 5,524,924 A | 6/1996 | Steffens, Jr. et al. |
| 5,533,748 A | 7/1996 | Wirt et al. |
| 5,536,043 A | 7/1996 | Lang et al. |
| 5,544,913 A | 8/1996 | Yamanishi et al. |
| 5,556,128 A | 9/1996 | Sinnhuber et al. |
| 5,567,375 A | 10/1996 | Filion et al. |
| 5,615,914 A | 4/1997 | Galbraith et al. |
| 5,716,093 A | 2/1998 | Sadr |
| 5,718,449 A | 2/1998 | Numazawa et al. |
| 5,816,613 A * | 10/1998 | Specht et al. ................. 280/753 |
| 5,845,937 A | 12/1998 | Smith |
| 5,865,468 A | 2/1999 | Hur |
| 5,927,755 A | 7/1999 | Matsuo et al. |
| D412,880 S | 8/1999 | Sadr |
| 5,931,493 A | 8/1999 | Sutherland |
| 5,957,493 A | 9/1999 | Larsen et al. |
| 5,967,594 A | 10/1999 | Ramanujam |
| 5,968,431 A | 10/1999 | Ang et al. |
| 6,032,978 A | 3/2000 | Spencer et al. |
| 6,131,950 A * | 10/2000 | Schroter ......................... 280/753 |
| 6,142,520 A * | 11/2000 | Iino et al. .................... 280/743.1 |
| 6,158,766 A | 12/2000 | Kowalski |
| 6,170,871 B1 | 1/2001 | Goestenkors et al. |
| 6,193,272 B1* | 2/2001 | Aigner et al. ............... 280/730.1 |
| 6,203,057 B1 | 3/2001 | Spencer et al. |
| 6,213,497 B1 | 4/2001 | Spencer et al. |
| 6,231,072 B1 | 5/2001 | Pywell et al. |
| 6,250,665 B1 | 6/2001 | Sutherland et al. |
| 6,305,710 B1 | 10/2001 | Bosgieter et al. |
| 6,336,653 B1* | 1/2002 | Yaniv et al. ................. 280/730.1 |
| 6,338,501 B1* | 1/2002 | Heilig et al. ................... 280/753 |
| 6,435,554 B1 | 8/2002 | Feldman |
| 6,471,242 B2 | 10/2002 | Schneider |
| 6,517,103 B1 | 2/2003 | Schneider |
| 6,536,802 B1 | 3/2003 | Sutherland et al. |
| 6,543,838 B1 | 4/2003 | Bertolini et al. |
| 6,568,743 B1 | 5/2003 | Jayasuriya et al. |
| 6,578,867 B2 | 6/2003 | Khoudari et al. |
| 6,588,557 B2 | 7/2003 | Williams et al. |
| 6,619,689 B2 | 9/2003 | Spencer et al. |
| 6,688,643 B2 | 2/2004 | Schneider |
| 6,712,385 B2 | 3/2004 | Enders |
| 6,715,789 B2 | 4/2004 | Takimoto et al. |
| 6,758,493 B2 | 7/2004 | Conlee et al. |
| 6,817,625 B2 | 11/2004 | Hjerpe |
| 6,817,627 B2 | 11/2004 | Galmiche et al. |
| 6,848,715 B2 | 2/2005 | Nelson et al. |
| 6,874,811 B2 | 4/2005 | Enders et al. |
| 6,971,667 B2 | 12/2005 | Enders et al. |
| 6,976,706 B2 | 12/2005 | Smith et al. |
| 6,991,252 B2 | 1/2006 | Enders |
| 7,021,652 B2 | 4/2006 | Kumagai et al. |
| 7,055,083 B2 | 5/2006 | Wang |
| 7,055,853 B2 | 6/2006 | Honda et al. |
| 7,086,663 B2 | 8/2006 | Honda |
| 7,093,846 B2 | 8/2006 | Reiter et al. |
| 7,093,851 B2 | 8/2006 | Lotspih |
| 7,144,032 B2 | 12/2006 | Lunt et al. |
| 7,168,733 B2 | 1/2007 | Kumagai et al. |
| 7,213,840 B2 | 5/2007 | Kumagai |
| 7,322,598 B2 | 1/2008 | Galmiche et al. |
| 7,350,852 B2 | 4/2008 | Rust et al. |
| 7,367,587 B2 | 5/2008 | Taoka |
| 7,393,013 B2 | 7/2008 | Best et al. |
| 7,396,040 B2 | 7/2008 | Enders et al. |
| 7,413,215 B2 | 8/2008 | Weston et al. |
| 7,422,234 B2 | 9/2008 | Huber et al. |
| 7,448,645 B2 | 11/2008 | Bederka et al. |
| 7,481,457 B2 | 1/2009 | Best et al. |
| 7,568,722 B2 | 8/2009 | Sato et al. |
| 7,578,518 B2 | 8/2009 | Ochiai et al. |
| 7,735,865 B2 | 6/2010 | Cappabianca et al. |
| 7,874,587 B2 | 1/2011 | Miki et al. |
| 7,980,589 B2 | 7/2011 | Best et al. |
| 8,146,943 B2 | 4/2012 | Fukawatase et al. |
| 2001/0054811 A1 | 12/2001 | Spencer et al. |
| 2002/0125691 A1* | 9/2002 | Conlee et al. ............... 280/730.1 |
| 2002/0171231 A1 | 11/2002 | Takimoto et al. |
| 2003/0127819 A1 | 7/2003 | Richardson |
| 2003/0197354 A1 | 10/2003 | Beland et al. |
| 2004/0007856 A1 | 1/2004 | Enders et al. |
| 2004/0075252 A1 | 4/2004 | Pan |
| 2004/0099644 A1 | 5/2004 | Allen |
| 2004/0100075 A1 | 5/2004 | Sakai et al. |
| 2004/0135353 A1 | 7/2004 | Enders et al. |
| 2004/0145163 A1 | 7/2004 | Galmiche et al. |
| 2004/0155447 A1 | 8/2004 | Smith et al. |
| 2004/0163872 A1 | 8/2004 | Lincoln et al. |
| 2004/0163873 A1 | 8/2004 | Polz et al. |
| 2004/0178616 A1 | 9/2004 | Yoshikawa |
| 2004/0232666 A1 | 11/2004 | Sato et al. |
| 2005/0023802 A1 | 2/2005 | Enders et al. |
| 2005/0029781 A1 | 2/2005 | Enders et al. |
| 2005/0052005 A1 | 3/2005 | Lunt et al. |
| 2005/0052010 A1 | 3/2005 | Best et al. |
| 2005/0052011 A1 | 3/2005 | Best et al. |
| 2005/0057024 A1 | 3/2005 | Weston et al. |
| 2005/0073134 A1 | 4/2005 | Matsuura et al. |
| 2005/0098996 A1 | 5/2005 | Enders |
| 2005/0116449 A1 | 6/2005 | Enders |
| 2005/0253369 A1 | 11/2005 | Taoka |
| 2006/0214400 A1 | 9/2006 | Enders et al. |
| 2007/0007753 A1 | 1/2007 | Williams et al. |
| 2007/0052219 A1 | 3/2007 | Rust et al. |
| 2007/0108746 A1 | 5/2007 | Ochiai et al. |
| 2007/0108747 A1 | 5/2007 | Roychoudhury et al. |
| 2007/0152431 A1 | 7/2007 | Rust et al. |
| 2007/0273179 A1 | 11/2007 | Hommel et al. |
| 2007/0296187 A1 | 12/2007 | Ochiai |
| 2008/0061537 A1 | 3/2008 | Enders |
| 2008/0203714 A1* | 8/2008 | Untersinger et al. ......... 280/741 |
| 2009/0152848 A1 | 6/2009 | Sadr et al. |
| 2009/0152849 A1 | 6/2009 | Saraf et al. |
| 2009/0250915 A1 | 10/2009 | Best et al. |
| 2010/0052296 A1 | 3/2010 | Sasaki et al. |
| 2010/0194081 A1 | 8/2010 | Thomas et al. |
| 2010/0320736 A1* | 12/2010 | Traber et al. ............... 280/743.1 |
| 2010/0327566 A1 | 12/2010 | Matsushima |
| 2011/0109064 A1 | 5/2011 | Best et al. |
| 2011/0115201 A1 | 5/2011 | Best et al. |
| 2011/0123739 A1 | 5/2011 | Ciplijauskas et al. |
| 2011/0133435 A1 | 6/2011 | Sadr et al. |
| 2011/0156378 A1 | 6/2011 | Matsushima et al. |
| 2011/0198827 A1 | 8/2011 | Roychoudhury |
| 2012/0080871 A1 | 4/2012 | Roychoudhury et al. |

FOREIGN PATENT DOCUMENTS

| | | |
|---|---|---|
| DE | 3737081 | 5/1989 |
| DE | 19546143 | 6/1997 |
| DE | 19858520 | 4/2000 |
| DE | 10123207 | 7/2002 |

| | | |
|---|---|---|
| EP | 0274535 | 7/1988 |
| EP | 0678425 | 10/1995 |
| EP | 0684164 | 11/1995 |
| EP | 0872390 | 10/1998 |
| EP | 1426249 | 6/2004 |
| EP | 1663725 | 12/2009 |
| GB | 2272670 | 5/1994 |
| JP | 57058532 | 4/1982 |
| JP | 63-002741 | 1/1988 |
| JP | 63207744 | 8/1988 |
| JP | 282946 | 6/1990 |
| JP | 2249740 | 10/1990 |
| JP | 5016758 | 1/1993 |
| JP | 06-037011 | 5/1994 |
| JP | 7291084 | 11/1995 |
| JP | H08-258604 | 10/1996 |
| JP | 10504784 | 5/1998 |
| JP | 10512210 | 11/1998 |
| JP | H11-028998 | 2/1999 |
| JP | 11-091454 | 4/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2007-504050 | 3/2007 |
| JP | 2007090954 | 4/2007 |
| JP | 4083653 | 4/2008 |
| JP | 4136876 | 8/2008 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

U.S. Appl. No. 12/955,491 Office Action dated Jun. 24, 2011.
Anonymous "Inflatable Bellows-Box Panel" Research Disclosure, Mason Publications, Hampshire, Great Britain, vol. 374, No. 9 (Jun. 1, 1995).
Canadian Patent Application No. 2,535,661 Notice of Allowance dated Feb. 1, 2010.
Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71(3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
European Patent Application No. 06804728.1 Communication under Rule 71(3) EPC dated Jun. 14, 2010.
European Patent Application No. 06804728.1 Examination Report dated Oct. 27, 2009.
European Patent Application No. 06804728.1 Response to European Examination Report dated Mar. 3, 2010.
European Patent Application No. 06804728.1 Supplementary European Search Report dated Jun. 15, 2009.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2006/001862 International Search Report and Written Opinion dated Feb. 1, 2007.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
European Patent Application No. 06771989.8 Examination Report dated Feb. 2, 2011.
U.S. Appl. No. 11/560,473 Office Action dated Mar. 15, 2010.
U.S. Appl. No. 11/560,473 Office Action dated Oct. 22, 2010.
U.S. Appl. No. 11/560,473 Advisory Action dated Jan. 12, 2011.
U.S. Appl. No. 11/915,797 Office Action dated Feb. 18, 2010.
U.S. Appl. No. 11/915,797 Office Action dated Apr. 14, 2010.
U.S. Appl. No. 12/422,389 Office Action dated Mar. 17, 2010.
U.S. Appl. No. 12/422,389 Office Action dated Nov. 8, 2010.
U.S. Appl. No. 12/422,389 Advisory Action dated Jan. 24, 2011.
U.S. Appl. No. 12/422,389 Advisory Action dated Feb. 22, 2011.
European Search Report for Application No. 12168676.0 dated Jun. 26, 2012.
German Patent Application No. 112009000827.5 Office Action dated Apr. 16, 2012 (English Translation and Original).
International Search Report and Written Opinion of the International Searching Authority, International Patent Application No. PCT/CA2011/000518, mailed Aug. 11, 2011.
Japanese Office Action for Application No. 2008-514914 dated Aug. 31, 2011, 6 pages.
Office Action in relation to U.S. Appl. No. 12/955,491, mailed Jun. 24, 2011.
Office Action in relation to U.S. Appl. No. 12/955,491, mailed on May 10, 2011.
U.S. Appl. No. 12/937,096 Office Action dated Aug. 24, 2012.
U.S. Appl. No. 12/978,139 Office Action dated Jun. 8, 2012.
U.S. Appl. No. 13/180,182 Office Action dated Dec. 21, 2012 (9 pages).
U.S. Appl. No. 12/937,100 Office Action dated Dec. 6, 2012 (6 pages).

* cited by examiner

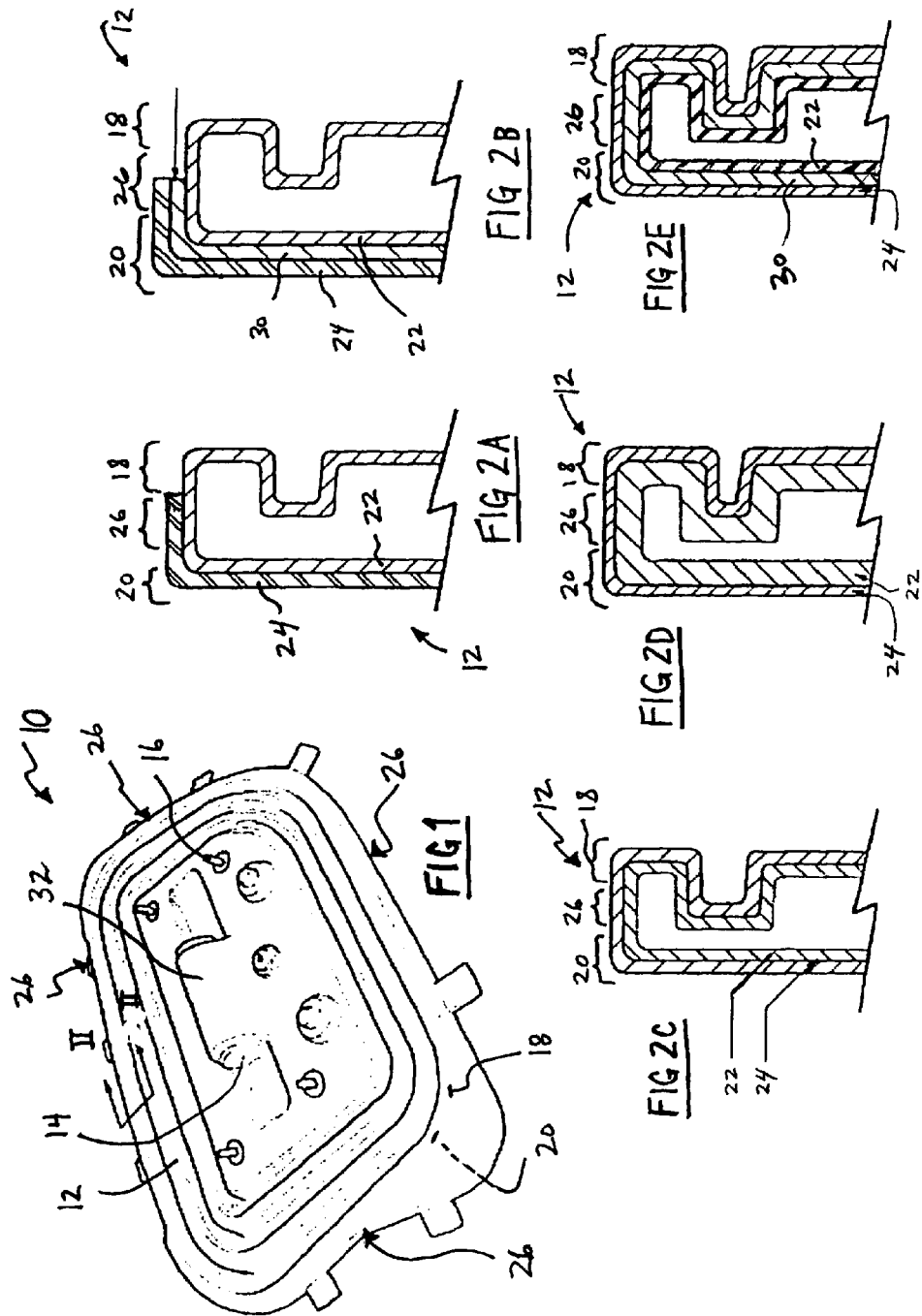

INFLATABLE MULTILAYER BOLSTER AND METHOD OF MANUFACTURE

CROSS-REFERENCE TO RELATED APPLICATIONS

This patent application is a national stage filing under 35 U.S.C. 371 of International Application No. PCT/CA2009/000476, filed Apr. 14, 2009, which claims priority benefits to U.S. Provisional Application No. 61/044,294, filed Apr. 11, 2008, the entire contents of which are incorporated herein by reference.

FIELD OF THE INVENTION

The present invention relates generally to the field of safety devices for vehicles. More particularly, it concerns an inflatable bolster for use in the passenger compartment of a vehicle.

BACKGROUND OF THE INVENTION

Bolsters and the like are known in the art. A conventional bolster is mounted within a passenger compartment and includes a hollow body and an inflator for injecting a pressurized fluid into the hollow body. In order to reduce the potential for injuries caused during an impact event or the like, the inflator is activated upon detection of such an event and the bolster is inflated.

For example, the impact event may be a front, rear or side impact, a rollover, or any other event which is likely to cause a rapid change in the vehicle's momentum and thereby cause the occupant to strike some portion of the vehicle's passenger compartment. The fluid released by the inflator into the hollow body serves to inflate the bolster, bringing its outer surface closer to an occupant. By decreasing the distance between the occupant and its outer surface, the bolster can absorb more of the occupant's momentum over a longer period of time, thereby lessening the force experienced.

Bolsters may be provided as part of an instrument panel, a door panel, roof panel, a head rest, or other interior portion of the vehicle.

Known in the art are the following patent and patent applications which disclose inflatable bolsters and the like: US 2007/0108747; U.S. Pat. No. 6,032,978; U.S. Pat. No. 6,203,057; U.S. Pat. No. 6,305,710; U.S. Pat. No. 6,517,103; U.S. Pat. No. 6,578,867; U.S. Pat. No. 6,619,689; U.S. Pat. No. 6,758,493; U.S. Pat. No. 6,848,715; U.S. Pat. No. 6,976,706; U.S. Pat. No. 7,350,852; and WO 2006/132990.

Since bolsters are integrated within the interior of a vehicle, the aesthetic appearance of the bolsters and of the overall interior is an important factor to consider. Bolsters must often present a seamless and consistent appearance once integrated within the vehicle.

Bolsters have been manufactured using various techniques and assembly methods. Many known bolsters are made by assembling independent front and back panels using a variety of fasteners such that the front panel can rapidly project forward when triggered. Producing separate main components to be assembled together can be time consuming and inefficient. In addition, each of the separate components must be designed and interconnected to provide an aesthetic integral whole which can be difficult.

At the same time, a bolster must have sufficient structure to be properly integrated into the vehicle and retain its form in a passive state. It is often difficult to reconcile structural capacity, efficient production and certain desired aesthetic characteristics.

There is currently a need for a technology that overcomes at least some of the drawbacks of what is known in the field.

SUMMARY OF THE INVENTION

The present invention responds to the above need by providing an inflatable multilayer bolster and a method of manufacturing an inflatable multilayer bolster.

According to one preferred aspect, the invention provides an inflatable multilayer bolster for use in a passenger compartment of a vehicle. The multilayer bolster comprises a hollow body which comprises a back wall devised to face a mating surface of the vehicle; a front wall opposite the back wall and devised to face the passenger compartment; and an air chamber formed between the front and back walls. The front wall comprises an inner layer made of a structural deformable material and an outer surfacing layer co-extruded with the inner layer. The bolster also comprises an inflator for injecting a pressurized fluid into the air chamber and thereby inflating the hollow body, the inflator being mounted to the hollow body.

According to another preferred aspect, the invention provides a method of manufacturing an inflatable multilayer bolster for use in a passenger compartment of a vehicle. The method comprises co-extruding a first polymer and a second polymer through a die to produce a parison, followed by blow-molding the parison to form a hollow body. The hollow body comprises a back wall devised to face a mating surface of the vehicle; a front wall opposite the back wall and devised to face the passenger compartment; an air chamber formed between the front and back walls; and an inflation port in fluid communication with the air chamber for receiving a pressurized fluid to inflate the hollow body. The front wall of the hollow body comprises an inner layer made of the first polymer in a structural deformable condition and an outer surfacing layer made of the second polymer.

This multilayer bolster and this method of manufacture provide a simplified and efficient bolster construction whereby the inner layer of polymer provides the required structure and deformability while the outer surfacing layer being co-extruded with the inner layer can efficiently provide improved aesthetic appearance characteristics and is more efficiently manufactured.

Further aspects and advantages of the present invention will be better understood upon reading of preferred embodiments thereof with respect to the appended drawings.

BRIEF DESCRIPTION OF THE DRAWINGS

FIG. 1 is a perspective view of an inflatable bolster according to an embodiment of the present invention.

FIG. 2A is a cross-sectional view taken along line II-II of FIG. 1, showing the multilayer structure according to one embodiment of the present invention.

FIG. 2B is a cross-sectional view taken along line II-II of FIG. 1, showing the multilayer structure according to another embodiment of the present invention.

FIG. 2C is a cross-sectional view taken along line II-II of FIG. 1, showing the multilayer structure according to yet another embodiment of the present invention.

FIG. 2D is a cross-sectional view taken along line II-II of FIG. 1, showing the multilayer structure according to still another embodiment of the present invention.

FIG. 2E is a cross-sectional view taken along line II-II of FIG. 1, showing the multilayer structure according to another embodiment of the present invention.

Figure 4:
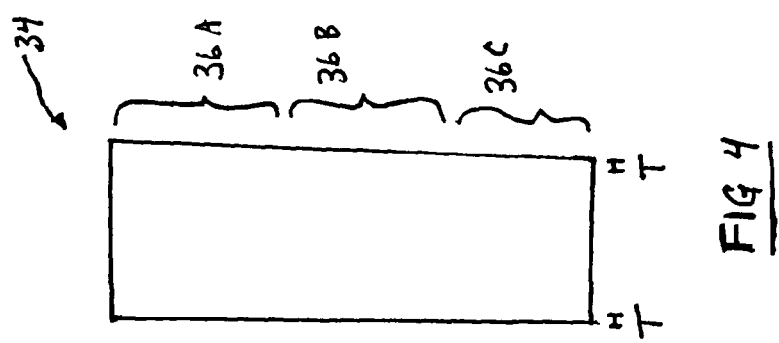
FIG. 4 is a side view sketch of a parison for making an embodiment of an inflatable bolster according to an embodiment of the method of the present invention.

While the invention will be described in conjunction with example embodiments, it will be understood that it is not intended to limit the scope of the invention to such embodiments. On the contrary, it is intended to cover all alternatives, modifications and equivalents as may be included as defined by the present description and appended claims.

DESCRIPTION OF PREFERRED EMBODIMENTS

In the following description, similar features in the drawings have been given similar reference numerals and in order to lighten the figures, some elements are not referred to in some figures if they were already identified in a preceding figure.

FIG. 1 shows an embodiment of the inflatable bolster 10. The vehicle interior into which the bolster 10 is to be installed has not been shown. It will be appreciated however that the bolster 10 could be installed, or adapted to be installed, in a variety of places within the passenger compartment of a vehicle.

The bolster 10 comprises a hollow body 12, an inflator 14 mounted thereto, and attachment means 16 for mounting the hollow body 12 to a mating surface within the vehicle. The inflator is for injecting a pressurized fluid into the air chamber and thereby inflating the hollow body.

The hollow body 12 includes a back wall 18 devised to face a mating surface of the vehicle and a front wall 20 opposite the back wall 18 and devised to face a passenger compartment. A substantial portion of the front wall 20 will often be visible to the passenger, depending on the placement of the bolster. An air chamber (not visible in FIG. 1) is formed between the front wall 20 and the back wall 18.

Referring to FIGS. 2A to 2E, the front wall 20 comprises an inner layer 22 made of a structural deformable material and an outer surfacing layer 24 co-extruded with the inner layer.

Before delving into further features of the preferred embodiments, the following definitions should be noted.

"Structural deformable material" means a material that in a passive state makes up part of the structural form of the bolster and is deformable in response to the fluid released by the inflator into the hollow body. It should also be understood that the term "structural deformable condition" with reference to the first polymer and the inner layer means the condition of the structural deformable material once manufacturing is complete. It should also be understood that the level of structural rigidity of the inner layer may vary depending on the dimensions, the shape and the installation location of the bolster, among other factors. Indeed, various shapes may act to reinforce the structural capacity of the inner layer. It should also be understood that the inner layer may have different structural capacity, rigidity and elasticity at different locations, depending on its thickness, the polymer, additives, its relationship with other polymer layers, its shape, etc.

"Passenger compartment" means an interior compartment of the vehicle where an individual may be situated and may be used interchangeably with "occupant compartment".

"Inner layer" means the layer composed of the structural deformable material and is provided inward of the outer surfacing layer. The inner layer may be the innermost layer but there may alternatively be another layer coating its interior surface.

"Outer surfacing layer" means the layer that covers the outer surface of the bolster at least in the region that is visible to the passenger within the vehicle, with the understanding that paint or other finishing coating may be applied to the outer surfacing layer as well in some embodiments.

It should also be understood that the multilayer bolster has at least two layers and may indeed have a third layer or further layers such as adhesive, intermediate, innermost, regrind, coating and/or structural layers.

In one preferred embodiment shown in FIGS. 2C to 2E, the entire hollow body 12 is a one-piece co-extruded structure having the inner and outer layers. Thus, the outer surfacing layer 24 surrounds the inner layer 22 in the inner layer's entirety and the back wall 18 would also include the inner layer 22 and the outer surfacing layer 24. Alternatively, as shown in FIGS. 2A and 2B, the outer surfacing layer 24 may be co-extruded on the front wall only, preferably wrapping around the sides.

Referring to FIGS. 2A to 2E, the hollow 12 body further includes joining sections 26 joining the front wall 20 to the back wall 18. The joining sections may have a variety of forms, structures and shapes as desired.

FIG. 1 illustrates that the joining section 26 preferably surrounds the perimeter of the bolster to join the front and back walls together.

Due to the co-extrusion method used to manufacture the bolster 10, the joining sections 26 may be formed in different ways.

Figure 3:
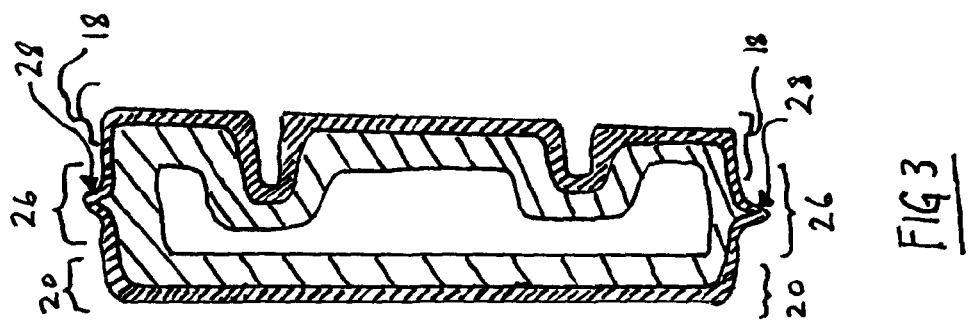
FIG. 3 is a cross-sectional view of an inflatable bolster according to an embodiment of the present invention.

FIG. 3 shows the hollow body 12 with a pair of opposed joining sections 26, here illustrated as top and bottom sections. These joining sections 26 include a pinch region 28. The pinch region 28 is devised such that only the outer surfacing layer 24 is visible to the passenger.

As shown in FIGS. 2C and 2D, the inner layer 22 and the outer surfacing layer 24 are preferably directly melt-bonded to each other when co-extruded.

Alternatively, as shown in FIG. 2E, there may be an intermediate layer 30 provided in between the inner 22 and outer 24 layers. The intermediate layer 30 may be an additional polymer layer to provide particular properties to the hollow body 12, or an adhesive layer to help bond the inner 22 and outer 24 layers together.

The inner layer 22 is preferably composed of a thermoplastic olefin such as Salflex 245™. The outer surfacing layer 24 is preferably composed of a thermoplastic olefin or polypropylene. The polymer of the outer surfacing layer 24 further may also preferably include at least one scratch or mar resistance additive, such as calcium oxide, calcium carbonate, mica or wax or a combination of such additives. It should also be noted that inner layer 22, outer layer 24 and/or other layers may include either virgin material or scrap reground material. The inner layer 22 of the hollow body 12 may also be modified so as to provide particular structural capacity, for instance by containing additives or being shaped to provide structure. Preferably, all layers of the hollow body 12 are simultaneously co-extruded into a parison and then blow-molded.

Preferably, the inner layer 22 is composed of a first polymer and the outer surfacing layer 24 comprises a second polymer different from the first polymer. The second polymer is chosen such that it may act as an appropriate surfacing layer. For instance, the second polymer may have a lower gloss level than the first polymer. The second polymer may have a lower viscosity at a molding temperature than the first polymer, to be more conducive to graining as grain is imparted to the polymer layer by the mold. It is also preferred that the first and second polymers have a substantially similar viscosity at extrusion conditions to facilitate initial that part of the process, and the second polymer has a lower viscosity at the blow-molding conditions for graining purposes. The second polymer may have a greater acceptance of coloring agents than the first polymer; it may for instance have an improved base color for coloring. The outer surfacing layer may include a colorant or be formed of a material so as to match the appearance of other interior vehicle components.

Preferably, as shown in the embodiment of FIG. 2D, the outer surfacing layer 24 has an inferior thickness compared to the inner layer 22. The outer surfacing layer may be provided as thin as possible to improve the visual appearance while minimizing material consumption. By way of example, the outer layer 24 may have a thickness between about 0.1 mm and about 2 mm and the inner layer 22 may have a thickness between about 1 and about 5 mm. It should also be noted that each of the inner 22 and outer 24 layers may have variable thickness at different locations of the bolster 10. For instance, it may be desired to provide a smaller thickness at the joining sections 26 to facilitate inflation, while keeping the central parts of the bolster thicker and thus more rigid.

The following will describe an optional embodiment of a method of manufacturing an embodiment of the inflatable multilayer bolster 10.

The method includes co-extruding a first polymer and a second polymer through a die to produce a parison and then blow-molding the parison to form a hollow body.

In the blow-molding step, the hollow body 12 is molded to as to have the back wall 18, the front wall 20, the air chamber between the front and back walls, and also an inflation port 32 in fluid communication with the air chamber for receiving a pressurized fluid to inflate the hollow body 12. The inflation port 32 houses the inflator 14.

The parison is co-extruded and has a moldable temperature during subsequent blow-molding. However, once the molding is complete the hollow body 12 will be composed of the inner layer 22 which is in a structural deformable condition and the outer surfacing layer 24.

The co-extrusion may be performed by providing at least two polymer inputs and co-extruding them through a die concentrically to produce a radially inner layer and at least one layer radially adjacent to the inner layer. Additional layers may be co-extruded, each being radially adjacent to the previous inward layer. As some polymers are better bonded together by an adhesive, it may be desired to co-extrude an adhesive layer in between two layers.

When co-extruded, the parison is tubular and may have a variety of cross-sections. Preferably the parison has a circular cross-section and is substantially cylindrical. Since the parison is tubular and has two opposed open ends, the blow-molding step preferably includes pinching each open end so as to form the corresponding pinch region 28 joining the front wall 20 and the back wall 18. The pinching may be performed by orienting or providing the pinch region 28 such that only the outer surfacing layer is visible to the passenger. The pinch region may be formed by flashless design or by other techniques whereby the pinching is placed away from the occupants line of sight.

The co-extrusion is preferably performed so that the entire parison has a double-walled structure respectively formed of the first and second polymers. In other words, the co-extruding preferably includes extruding the first polymer into a tubular form and extruding the second polymer directly to the first polymer to completely surround the same, thereby producing the parison.

Referring now to FIG. 4, the parison 34 may have tubular subsections. In the illustrated example, the parison 34 has three subsections 36A-36C along its length, but this is merely exemplary and there may be less or more subsections of various lengths along the parison 34. Each subsection has a substantially constant wall thickness T horizontally. The co-extruding may be controlled so that at least one of the tubular subsections 36A-36C has a different wall thickness T from one of the other tubular subsections. Thus, once the parison 34 is blow-molded, the hollow body 12 may have parts having differing wall thicknesses. For instance, subsection 36B of the parison 34 may be given a greater thickness and thus the corresponding central region of the front and back walls of the bolster may be thicker, less deformable and may include molded integral components. For example, the inflation port 32 may be molded from a parison subsection having a greater thickness which bestows improved properties on that part of the bolster.

As for the blow-molding step, once the parison is extruded, mold portions (usually halves) are closed over the parison and a gas is blown to the interior of the parison to expand it against the interior walls of the mold cavity defined by the mold portions. The mold cavity may be provided to have outcrops and recesses that define various elements of the hollow body, such as attachment points, the injector port, vents, etc. The mold may also be provided so as to form ribs, pleats, and other structural and inflation-facilitating shapes, particularly in the back wall and the joining sections of the bolster.

Embodiments of the inflatable multilayer bolster 10 and the method of manufacturing provide numerous advantages. There is a cost-reduction due to more efficient manufacturing, as there are fewer steps to obtain improved aesthetics of a one-piece bolster. In addition, two or more co-extruded layers may resist tear away from each other during bolster inflation. Furthermore, the chemical properties of the inner and outer layers may be tailored to best respond to the desired conditions. For instance, the inner layer may be composed of inexpensive material; its thickness may be varied to provide the necessary structure; it may go uncolored to save on colorant, etc. The outer surfacing layer may be provided as a thin skin to allow savings on colorant; it may be composed of a certain polymer or may include additives to allow improved aesthetics or better contact with the passenger upon impact. In addition, one can tune expansion characteristics by adjusting the different layers or by adding additional layers rather than reformulating base resin which can be quite laborious. The outer surfacing layer may also be made of a polymer having better electrical conduction properties to reduce static electricity and thus facilitate subsequent paint application.

Although the present invention has been explained hereinabove by way of a preferred embodiment thereof, it should be understood that the invention is not limited to this precise embodiment and that various changes and modifications may be effected therein without departing from the scope of what has actually been invented.

The invention claimed is:

1. An inflatable multilayer bolster for use in a passenger compartment of a vehicle, the multilayer bolster comprising:
 a hollow body comprising:
  a back wall devised to face a mating surface of the vehicle;
  a front wall opposite the back wall and devised to face the passenger compartment; and
  an air chamber formed between the front and back walls;
 wherein the front wall comprises an inner layer made of a structural deformable material and an outer surfacing layer co-extruded with the inner layer; and
 an inflator for injecting a pressurized fluid into the air chamber and thereby inflating the hollow body, the inflator being mounted to the hollow body.

2. The inflatable multilayer bolster of claim 1, wherein the hollow body is a one-piece structure.

3. The inflatable multilayer bolster of claim 1, wherein the back wall also comprises the inner layer and the outer surfacing layer.

4. The inflatable multilayer bolster of claim 1, wherein the hollow body further comprises joining sections joining the front wall to the back wall.

5. The inflatable multilayer bolster of claim 4, wherein the joining sections comprise a pair of opposed ends, each of the ends comprising a pinch region devised such that only the outer surfacing layer is visible to the passenger.

6. The inflatable multilayer bolster of claim 1, wherein the inner layer and the outer surfacing layer are directly melt-bonded to each other when co-extruded.

7. The inflatable multilayer bolster of claim 1, further comprising at least one intermediate layer via which the inner layer and the outer surfacing layer are bonded together.

8. The inflatable multilayer bolster of claim 1, wherein the inner layer is an innermost layer.

9. The inflatable multilayer bolster of claim 1, wherein the inner layer is composed of a thermoplastic olefin.

10. The inflatable multilayer bolster of claim 1, wherein the outer surfacing layer is composed of a thermoplastic olefin or polypropylene.

11. The inflatable multilayer bolster of claim 1, wherein the outer surfacing layer further comprises scratch or mar resistance additives calcium oxide, calcium carbonate, mica or wax or a combination thereof.

12. The inflatable multilayer bolster of claim 1, wherein the inner layer comprises a first polymer and the outer surfacing layer comprises a second polymer different from the first polymer.

13. The inflatable multilayer bolster of claim 12, wherein the second polymer has a lower gloss level than the first polymer.

14. The inflatable multilayer bolster of claim 12, wherein the second polymer has a lower viscosity at a molding temperature than the first polymer.

15. The inflatable multilayer bolster of claim 12, wherein the second polymer has a greater acceptance of coloring agents than the first polymer.

16. The inflatable multilayer bolster of claim 1, wherein the outer surfacing layer surrounds the inner layer in the inner layer's entirety.

17. The inflatable multilayer bolster of claim 1, wherein the outer surfacing layer comprises a colorant or is formed of a material so as to match the appearance of other interior vehicle components.

18. The inflatable multilayer bolster of claim 1, wherein the outer surfacing layer has an inferior thickness compared to the inner layer.

19. The inflatable multilayer bolster of claim 18, wherein the outer layer has a thickness between about 0.1 mm and about 2 mm and the inner layer has a thickness between about 1 and about 5 mm.

20. A method of manufacturing an inflatable multilayer bolster for use in a passenger compartment of a vehicle, the method comprising:
    co-extruding a first polymer and a second polymer through a die to produce a parison;
    blow-molding the parison to form a hollow body comprising:
    a back wall devised to face a mating surface of the vehicle;
    a front wall opposite the back wall and devised to face the passenger compartment;
    wherein the front wall comprises an inner layer made of the first polymer in a structural deformable condition and an outer surfacing layer made of the second polymer;
    an air chamber formed between the front and back walls; and
    an inflation port in fluid communication with the air chamber for receiving a pressurized fluid to inflate the hollow body.

21. The method of claim 20, wherein the parison has a pair of opposed open ends and wherein the blow-molding further comprises pinching each open end so as to form a corresponding pinch region joining the front wall and the back wall.

22. The method of claim 21, wherein the pinching further comprises orienting the pinch region such that only the outer surfacing layer is visible to the passenger.

23. The method of claim 20, wherein the co-extruding comprises extruding the first polymer into a tubular form and extruding the second polymer with the first polymer to completely surround the same, thereby producing the parison.

24. The method of claim 23, wherein the co-extruding comprises extruding the second polymer directly to the first polymer.

25. The method of claim 20, wherein the parison comprises tubular subsections each comprising the first and second polymer, and the co-extruding is controlled so that at least one of the tubular subsections has a different wall thickness from another of the tubular subsections.

26. The method of claim 25, wherein the co-extruding comprises providing a given tubular subsection of the parison with greater thickness than the other subsections, and wherein the blow-molding comprises molding the inflation port at a location that is part of the given tubular subsection.

27. The method of claim 20, wherein the first polymer is a thermoplastic olefin.

28. The method of claim 20, wherein the second polymer is a thermoplastic olefin or polypropylene.

29. The method of claim 20, wherein the second polymer further comprises scratch or mar resistance additives calcium oxide, calcium carbonate, mica or wax or a combination thereof.

* * * * *

UNITED STATES PATENT AND TRADEMARK OFFICE
CERTIFICATE OF CORRECTION

PATENT NO.       : 8,388,020 B2                               Page 1 of 1
APPLICATION NO.  : 12/937104
DATED            : March 5, 2013
INVENTOR(S)      : Ciplijauskas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this
First Day of September, 2015

Michelle K. Lee
*Director of the United States Patent and Trademark Office*